United States Patent
Godai

(10) Patent No.: US 9,839,229 B2
(45) Date of Patent: Dec. 12, 2017

(54) THAWING METHOD FOR FROZEN GOODS

(71) Applicant: SANTETSU ENGINEERING INC., Hyogo (JP)

(72) Inventor: Tomoyuki Godai, Hyogo (JP)

(73) Assignee: Santetsu Engineering Inc., Hyogo (JP)

( * ) Notice: Subject to any disclaimer, the term of this patent is extended or adjusted under 35 U.S.C. 154(b) by 0 days.

(21) Appl. No.: 15/021,020

(22) PCT Filed: Sep. 3, 2014

(86) PCT No.: PCT/JP2014/004537
§ 371 (c)(1),
(2) Date: Mar. 10, 2016

(87) PCT Pub. No.: WO2015/040816
PCT Pub. Date: Mar. 26, 2015

(65) Prior Publication Data
US 2016/0219922 A1    Aug. 4, 2016

(30) Foreign Application Priority Data
Sep. 19, 2013  (JP) .................................. 2013-193751

(51) Int. Cl.
*A23L 3/365* (2006.01)
*A23B 4/07* (2006.01)

(52) U.S. Cl.
CPC ............... *A23L 3/365* (2013.01); *A23B 4/07* (2013.01); *A23V 2002/00* (2013.01)

(58) Field of Classification Search
CPC ........ A23L 3/365; A23B 4/07; A23V 2002/00
See application file for complete search history.

(56) References Cited

U.S. PATENT DOCUMENTS

| | | | |
|---|---|---|---|
| 5,034,236 A | | 7/1991 | Ohtsuki |
| 2007/0186580 A1* | | 8/2007 | Kaplan .................. A23L 3/36 62/457.5 |
| 2010/0199861 A1* | | 8/2010 | Godai ................... A23B 4/012 99/483 |

FOREIGN PATENT DOCUMENTS

| | | |
|---|---|---|
| JP | 61-005745 A | 1/1986 |
| JP | 5-63296 U | 8/1993 |
| JP | 5-77387 B2 | 10/1993 |

(Continued)

OTHER PUBLICATIONS

English Translation for JP2004/229577 published Aug. 2004.*

(Continued)

*Primary Examiner* — Anthony Weier
(74) *Attorney, Agent, or Firm* — The Ollila Law Group LLC

(57) ABSTRACT

A method of thawing an object (21) in a frozen state placed in an interior of a container (10), in which an AC voltage which is 10V or higher and 5 kV or lower is applied to the object (21) in the frozen state to flow a current which is 1 μA or higher and 1000 mA or lower, through the object (21) in the frozen state, includes the steps of: partially thawing the object (21) in the frozen state in such a manner that a temperature in the interior of the container (10) is controlled to cause the object (21) in the frozen state to be partially thawed while applying the AC voltage to the object (21) in the frozen state; and stopping application of the AC voltage to the object (21) and preserving the object (21) while maintaining a state in which the object (21) partially thawed.

3 Claims, 2 Drawing Sheets

(56) References Cited

FOREIGN PATENT DOCUMENTS

| | | | |
|---|---|---|---|
| JP | 2004-576275 | * | 8/2004 |
| JP | 2006-25735 A | | 2/2006 |
| NZ | 329523 | * | 6/1999 |
| WO | 2008096631 A1 | | 3/2008 |
| WO | PCT/JP14/004537 | | 9/2014 |

OTHER PUBLICATIONS

He et al . Journal of Food Engineering. 2012. vol. 115. pp. 24-250.*
Derwent Abstract for KR2011110925 published Oct. 2011.*
Supervised by Japan Frozen food Association, Saishin Reito, Shokuhin Jiten, 1st edition, Asakura Publishing Co., Ltd., 1994, pp. 596 to 597, 5th paragraph.
Yaziang Bai, Yang Sun, Zhuo Li, Dongmai Kang: "Study the optimum parameters of high voltage electrostatic field thawing", Procedia Engineering, vol. 16, 2011, pp. 679-684, XP002768663.
Xiangli He et al: "Effect of high voltage electrostatic filed treatment on thawing characteristics and post-thawing quality of frozen pork tenderloin meat", Journal of Food Engineeering, vol. 115, No. 2, Mar. 1, 2013 (Mar. 1, 2013), pp. 245-250, XP055359439 GB ISSN: 0260-8774, DOI: 10.1016/j.jfoodeng.2012.10.023.
Xiangli He et al: Factors affecting the thawing characteristics and energy consumption of frozen pork tenderloin meat using high-voltage electrostatic field, Innovative Food Science and Emerging Technologies, vol. 22, Jan. 4, 2014, pp. 110-115, XP055359441, NL ISSN: 1466-8564, DOI: 10.1016/j.ifset.2013.12.019.

* cited by examiner

THAWING METHOD FOR FROZEN GOODS

TECHNICAL FIELD

The present invention relates to a thawing method of a frozen object.

BACKGROUND ART

There is known a technique which can suppress quality deterioration (e.g., oxidation or dripping resulting from tissue destruction of cells), which takes place when frozen food is thawed.

For example, there is proposed a method (hereinafter will be referred to as "voltage application thawing") of thawing frozen food, while providing a function (e.g., function which activates cells to suppress the oxidation or the dripping resulting from the tissue destruction of the cells) using electric energy, by applying a predetermined AC voltage to the frozen food to flow a weak current through the frozen food (see Patent Literature 1).

CITATION LIST

Patent Literature

Patent Literature 1: International Publication No. 2008/096631

SUMMARY OF INVENTION

Technical Problem

However, in the above-described Patent Literature 1, a correlation between the thawing temperature of the frozen food and the effectiveness of the voltage application thawing is not studied sufficiently.

The present invention has been developed in view of the above-described circumstances, and an object of the present invention is to provide a novel thawing method of a frozen object, which can effectively perform the function of the voltage application thawing, while properly controlling the thawing temperature of the frozen object, compared to a conventional thawing method.

Solution to Problem

To achieve the above-described object, according to an aspect of the present invention, there is provided a method of thawing an object in a frozen state placed in an interior of a container, in which an AC voltage which is 10V or higher and 5 kV or lower is applied to the object in the frozen state to flow a current which is 1 µA or higher and 1000 mA or lower, through the object in the frozen state, the method comprising the steps of: partially thawing the object in the frozen state in such a manner that a temperature in the interior of the container is controlled to cause the object in the frozen state to be partially thawed while applying the AC voltage to the object in the frozen state; and stopping application of the AC voltage to the object and preserving the object while maintaining a state in which the object is partially thawed.

In this method, the function of the voltage application thawing can be effectively performed while controlling the thawing temperature of the object in the frozen state, compared to a conventional thawing method.

According to a second aspect of the present invention, the method of thawing the object in the frozen state according to the first aspect, further comprises the step of: preserving the object in the interior of the container, while maintaining the state in which the object is partially thawed and applying the AC voltage to the object, between the step of partially thawing the object in the frozen state and the step of preserving the object.

In this method, the function of the voltage application thawing can be provided to the object and the object can be preserved properly.

According to a third aspect of the present invention, the method of thawing the object in the frozen state according to the first or second aspect, further comprises the step of: thawing the object outside the container at a room temperature, after the step of partially thawing the object in the frozen state.

In this method, the object can be thawed at a room temperature (naturally thawed), while maintaining the function of the voltage application thawing.

Advantageous Effects of Invention

In accordance with the present invention, it becomes possible to obtain a novel thawing method of a frozen object, which can effectively perform the function of the voltage application thawing, while properly controlling the thawing temperature of the frozen object, compared to a conventional thawing method.

DESCRIPTION OF EMBODIMENTS

[Outline of Discovering the Embodiment of the Present Invention]

So far, the present inventors have been developing techniques for high-quality thawing and preservation of frozen food by making use of the function of the voltage application thawing.

In the course of the development of the techniques, the present inventors discovered that in a case where the voltage application thawing is used to thaw the frozen food, the function of the voltage application thawing can be provided properly to the frozen food, even when the frozen food is not completely thawed (the temperature of the frozen food is raised up to 0 degrees C. or higher) and is partially thawed at a minus temperature (temperature that is below 0 degrees C.). This may be related closely to how to unfreeze the moisture (free water, bond water) of the frozen food. For example, even in a case where frozen meat is partially thawed while providing the function of the voltage application thawing to the frozen meat at a minus temperature, the frozen meat is softened and the bond water is unfrozen to a greater extent, compared to a case where the function of the voltage application thawing is not provided to the frozen meat. From this, we consider that it is possible to suppress the tissue destruction of the frozen food which takes place, when the frozen food is completely thawed at a room temperature after the above-described partial thawing. In addition, we consider that the conventional effects (oxidation suppressing effects) achieved by application of the voltage to the frozen food can be obtained. From the above, we consider that the dripping and change in color of the frozen food can be suppressed.

The above-described finding is meant to defy the conventional common view that the frozen food is fundamentally thawed at a temperature of 0 degrees C. or higher, and to reduce a loss which takes place generally in a conventional thawing method, by performing partial thawing and preservation at a temperature of 0 degrees C. or lower, in the thawing of the frozen food.

Hereinafter, the specific example of the embodiment of the present invention will be described with reference to the drawings.

Note that the present invention is not limited to the specific example of the embodiment which will be described below. In other words, the following specific description merely illustrates one aspect of the present invention. For example, hereinafter, partial thawing and preservation of frozen food 21 will be described as an example of partial thawing and preservation of the frozen food. The present invention is also applicable to partial thawing and preservation of cultured cells or the like, as well as the partial thawing and preservation of the frozen food 21.

[Device Configuration]

Figure 1:
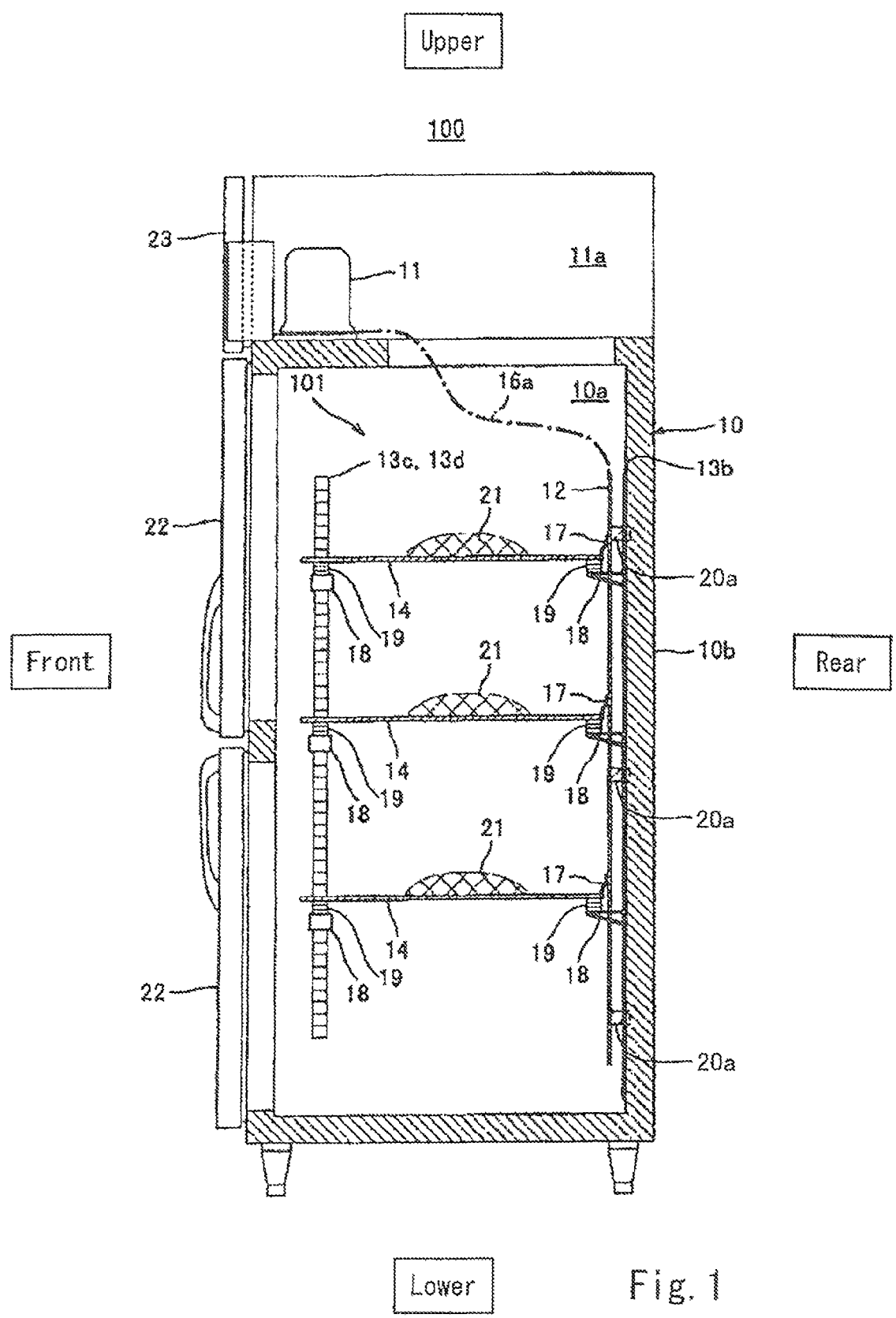
FIG. 1 is a view showing an exemplary thawing machine used in a thawing method of a frozen object according to the embodiment of the present invention.
Figure 2:
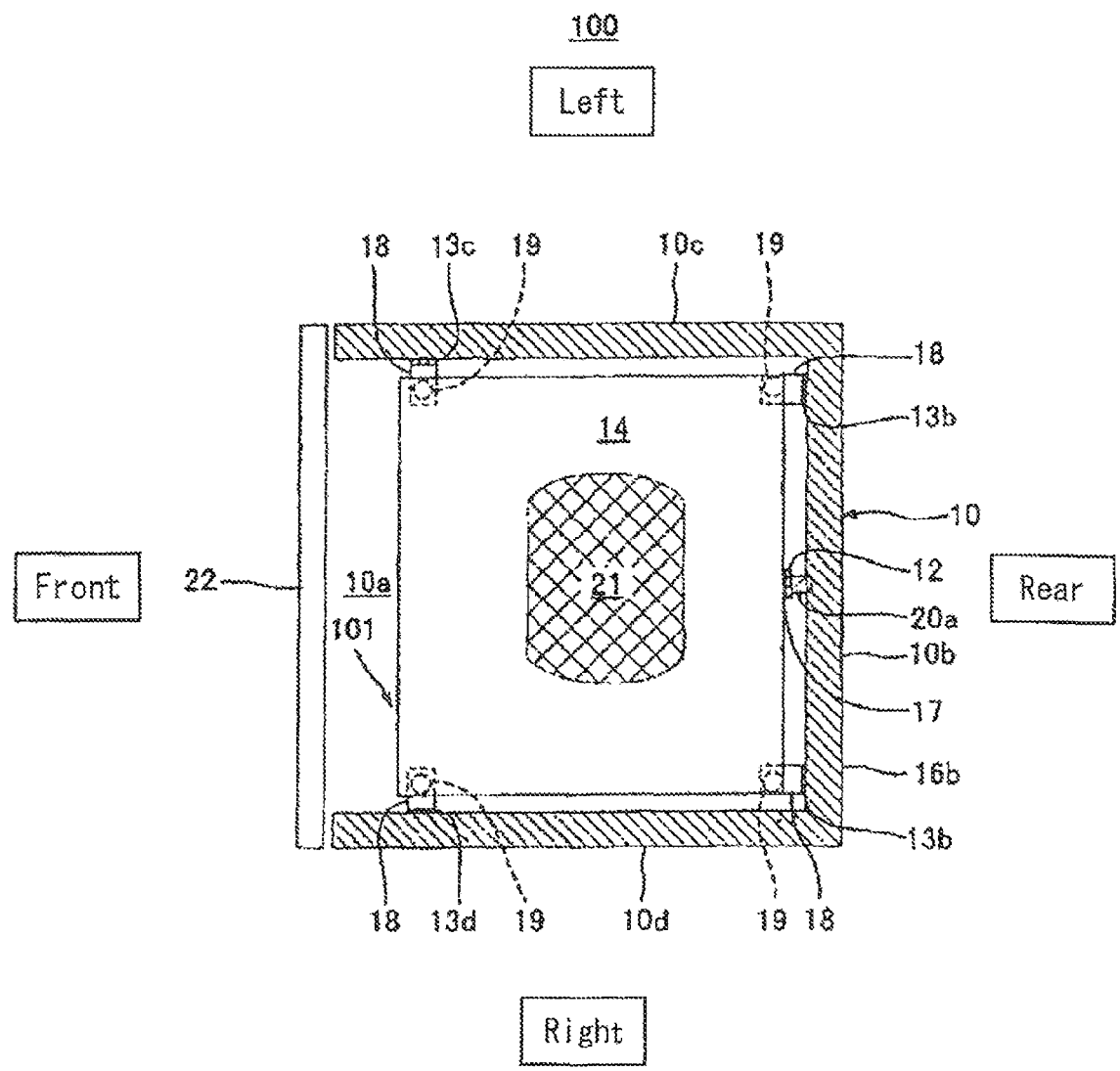
FIG. 2 is a view showing the thawing machine of FIG. 1, when viewed from a vertical direction.

FIG. 1 is a view showing an exemplary thawing machine used in a thawing method of frozen object according to the embodiment of the present invention. FIG. 2 is a view showing the thawing machine of FIG. 1, when viewed from a vertical direction.

In the example of FIGS. 1 and 2, for the sake of easier understanding of the description, a direction in which the weight of a thawing machine 100 is applied will be referred to as a "vertical direction", a side on which doors 22 of the thawing machine 100 are located will be referred to as a "front side", a side which is opposite to the doors 22 will be referred to as a "rear side", and a direction perpendicular to a forward and rearward direction of the front side and the rear side will be referred to as a "rightward and leftward direction."

The thawing machine 100 includes a container 10 which is capable of adjusting an internal temperature so that the thawing temperature of the frozen food 21 can become appropriate one, an AC power generating device 11 placed in a space 11a located above the container 10, and a table unit 101 placed in the space 10a of the container 10. The doors 22 and a door 23 are provided so that the interior of the space 10a and the interior of the space 11a are accessible.

The table unit 101 includes metal plates 14 on which the frozen food 21 is put, a current supplying rail 12 which is electrically connected to the metal plates 14 to apply an AC voltage to the metal plates 14, extends vertically, and is made of metal, and rod-like metal support bars 13b, 13c, 13d which support the metal plates 14 via insulators 19

Each of the metal support bars 13b, 13c, 13d is configured like a ladder. This allows hooks 18 to be engaged at proper height positions of the metal support members 13b, 13c, 13d. More specifically, in the present embodiment, one hook 18 is attached to each of the upper stage, intermediate stage, and lower stage of each of the four metal support bars 13b, 13c, 13d. The insulator 19 placed on each of these hooks 18 supports the metal plate 14 on which the frozen food 21 is put.

The AC power generating device 11 includes an electric transformer (not shown). One of a pair of secondary terminals of the electric transformer is electrically connected to the current supplying rail 12 via a wire 16a, and the other (not shown) of the secondary terminals of the electric transformer is opened. A plate spring 17 which is made of metal is placed between the current supplying rail 12 and each of the metal plates 14. In this configuration, the current supplying rail 12 and each of the metal plates 14, whose movement within a plane is restricted by proper fastening means, can electrically contact each other in a proper manner, by a biasing force applied from the plate spring 17. In the above-described manner, one of the secondary terminals of the electric transformer is electrically connected to each of the pair of metal plates 14. Each of the metal plates 14 (frozen food 21) and the other of the pair of secondary terminals of the electric transformer are insulated from each other by air.

A portion of each of insulators 20a is embedded in a rear wall 10b of the container 10. The above-described current supplying rail 12 is fastened to the tip end of each of the insulators 20a.

[Operation]

Hereinafter, the operation (the thawing method of the frozen food 21) of the thawing machine 100 will be described.

Initially, the door 22 of the container 10 is opened and closed, and the frozen food 21 is put on the metal plate 14. At this time, the temperature of the space 10a of the thawing machine 100 is adjusted to be set to a desired temperature.

Then, a primary voltage is applied across a pair of primary terminals of the electric transformer of the AC power generating device 11. In the present embodiment, this primary voltage is a sine wave AC voltage of a commercial frequency. Thereupon, a secondary voltage applied across the secondary terminals of the electric transformer is increased. A load voltage obtained by subtracting a voltage drop due to the presence of a restricting resistor (not shown), and a current meter (not shown) from the secondary voltage, is applied across the frozen food 21 (to be precise, the metal plate 14) and the other of the pair of secondary terminals of the electric transformer. Because of this, a weak load current corresponding to a load impedance (a leakage resistance or a leakage capacity) between the frozen food 21 and the other of the pair of secondary terminals of the electric transformer, flows through the frozen food 21. Thus, predetermined AC power is applied from the AC power generating device 11 to the current supplying rail 12, the metal plate 14 and the frozen food 21. Alternatively, a high-resistance element may be interposed between the metal plate 14 and a ground terminal, instead of opening the other of the secondary terminals. The above-described load voltage is preferably 10V or higher and 5 kV or lower, more preferably, 100V or higher and 5 kV or lower. The above-described load current is preferably 1 µA or higher and 1000 mA or lower, and more preferably 10 µA or higher and 100 mA or lower.

The above-described method of applying the voltage to the frozen food 21 by the current supplying rail 12 is exemplary, and the voltage application method is not limited to this current supplying rail method.

Then, the frozen food 21 is thawed in such a manner that the temperature of the container 10 is controlled to cause the frozen food 21 to be partially thawed while applying the AC voltage to the frozen food 21 (partial thawing step).

The term "partial thawing" is defined as thawing in a state in which the temperature of the frozen food 21 is in a range of, for example, 0 degrees C. to minus 10 degrees C.

Then, the application of the AV voltage to the food 21 is stopped, and the food 21 is preserved while maintaining the partially thawed state of the food 21 (preservation step).

Alternatively, between the above-described partial thawing step and the above-described preservation step, a step of preserving the food 21 in the interior of the container 10 while applying the AC voltage to the food 21 and maintaining the partially thawed state of the food 21 may be inserted.

Further, after the above-described partial thawing step, a step of thawing the food 21 outside the container 10 at a room temperature may be performed.

In the above-described manner, it becomes possible to reduce a loss which takes place generally in the conventional thawing method, by performing the partial thawing and preservation of the food 21 at a temperature of 0 degrees C. or lower, in the thawing of the frozen food 21. The reason is as follows.

Generally, in a case where the temperature of the frozen food 21 is raised up to a minus temperature in a temperature zone in which the food 21 can be processed, without using the function of the voltage application thawing, oxidation deterioration and deterioration of the cell tissues progress. However, in a case where the frozen food 21 is thawed by use of the function of the voltage application thawing, electric energy applied to the frozen food 21 activates the cells of the frozen food 21 and suppresses the dripping. As a result, the above-described deterioration hardly progresses.

In the application filed previously (International Publication No. 2012/098864), the present inventors proposed suppressing generation of apoptosis or necrosis of the cells, as one exemplary aspect of the above-described voltage application method.

In contrast, in the present application, the present inventors proposed a novel aspect of the voltage application method, in terms of the preservation of the frozen food 21 at a minus temperature.

Specifically, as described above, it was revealed that the function of the voltage application thawing can be properly provided to the frozen food 21, even in the partial thawing of the frozen food 21 at a minus temperature instead of the complete thawing (raising the temperature up to 0 degrees or higher) of the frozen food 21. Therefore, by use of the voltage application thawing to partially thaw the frozen food 21, the oxidation (change in color) of the food and the dripping of the food can be suppressed by the effectiveness of the function of the voltage application thawing.

As a result of the above, it becomes possible to realize the novel utilization method of the thawing machine 100, which is preservation of the food 21 after the frozen food 21 is thawed (partially thawed), and was difficult to perform in the conventional thawing method. In other words, by thawing and preserving the frozen food 21 at a temperature of 0 degrees C. or lower, the oxidation of the food and the dripping of the food can be suppressed by the voltage application thawing, while suppressing the proliferation of bacteria. This means that a loss generated when the frozen food 21 is thawed can be reduced significantly. Further, the yield in processing of the food 21 in the partially thawed state can be increased.

Experiment Example 1

An experiment was conducted to thaw a beef loin block in a frozen state under the same conditions except the condition in which the voltage was or was not applied to the frozen food 21. The specific procedure is as follows. The beef loin block was cut in half, and the resulting two beef loin blocks were thawed and preserved under the same temperature condition in which the temperature was −3 degrees C. (16 hours). After that, the two beef loin blocks were preserved intentionally for 12 hours under a temperature condition (30 degrees C.) at which the bacteria proliferated easily. Then, a test for checking the number of bacteria was conducted. The result of the present experiment is shown in the following table 1.

Through the above-described procedure, it could be confirmed that the oxidation and dripping of the beef loin block could be suppressed effectively by performing the voltage application thawing, when the beef loin block was thawed.

TABLE 1

| Application of voltage | Thawing/preservation at −3 degrees C. | Preservation at 30 degrees C. | Number of bacteria | Comparison of number of bacteria | Oxidation(color forming/change in color) state |
|---|---|---|---|---|---|
| Application | 16 h | 12 h | $3.0 \times 10^3$/g (3,000/g) | No foul odor (smell) of food is observed, number of bacteria is such that bacteria can be killed by cooking | Change in color due to oxidation is suppressed by oxidation suppressing effect |
| Non-application | 16 h | 12 h | $1.6 \times 10^5$/g (160,000/g) | Noticeable change in color and number of bacteria is greater than that of Depak | Progress of oxidation, change in color due to deterioration and foul (bad) state of food are observed |

Experiment Example 2

An experiment was conducted to thaw a pork loin block in a frozen state under the same conditions except the condition in which the voltage was or was not applied to the frozen food 21. The specific procedure is as follows. The pork loin block was cut in half, and the resulting two pork loin blocks were thawed under the same temperature condition in which the temperature was 0 degrees C. (16 hours). After that, the two pork loin blocks were preserved at −3 degrees C.

Then, in a test "1", after the above-described thawing, the two pork loin blocks were preserved under a temperature condition of −3 degrees C. for 1 week and then were sliced, and a difference in oxidation (change in color) between the two pork loin blocks was confirmed. In addition, in a test "2", after the above-described thawing, the two pork loin blocks were preserved under a temperature condition of −3 degrees C. for 2 weeks, and were preserved intentionally for 24 hours under a temperature condition (30 degrees C.) at which the bacteria proliferated easily. Then, a test for checking the number of bacteria was conducted. The result of the present experiment is shown in the following table 2.

Through the above-described procedure, it could be confirmed that the oxidation and the dripping of the pork loin block could be suppressed effectively by performing the voltage application thawing, when the pork loin block was thawed.

TABLE 2

Test [1]

| Application of voltage | Core temperature at starting | Thawing at 0 degrees C. | Core temperature after passage of 16 h | Preservation at −3 degrees C. | State |
|---|---|---|---|---|---|
| Application | −15.3 degrees C. | 16 h | −3.5 degrees C. | 1 week | Color forming (change in color) due to oxidation is suppressed by oxidation suppressing effect |
| Non-application | −15.1 degrees C. | 16 h | −3.0 degrees C. | 1 week | Color forming due to oxidation has progressed, change in color due to deterioration has progressed to a greater degree than in voltage application thawing |

Test [2]

| Application of voltage | Preservation at −3 degrees C. | Preservation at 30 degrees C. | Number of general bacteria | Coli group | State |
|---|---|---|---|---|---|
| Application | 2 weeks | 24 h | $8.9 \times 10^5$/g (890,000/g) | Negative | No foul odor of food is observed, number of bacteria is such that bacteria can be still killed by cooking |
| Non-application | 2 weeks | 24 h | $1.6 \times 10^7$/g (16,000,000/g) | Negative | Noticeable change in color and initial foul state of food in terms of number of bacteria are observed |

Experiment Example 3

An experiment was conducted to thaw a swordfish block in a frozen state under the same conditions except the condition in which the voltage was or was not applied to the frozen food 21. The specific procedure is as follows. The frozen swordfish block was cut in half, and the resulting two swordfish blocks were thawed and preserved under the same temperature condition in which the temperature was −3 degrees C. (24 hours). After that, the two swordfish blocks were preserved intentionally for 6 hours under a temperature condition (30 degrees C.) at which the bacteria proliferated easily. Then, a test for checking the number of bacteria was conducted. The result of the present experiment is shown in the following table 3.

Through the above-described procedure, it could be confirmed that the oxidation and dripping of the swordfish block could be suppressed effectively by performing the voltage application thawing when the swordfish block was thawed.

In light of consideration of time limit setting of food which is associated with the number of bacteria, by incorporated Foundation Japan Food Research Laboratories, with reference to the following table 4, the effectiveness of the present technique can be understood.

Specifically, according to Japanese Agricultural Standard (JAS), the freezing and preservation temperature of the frozen food is regulated to be kept at −18 degrees C. or lower. The freezing and preservation temperature of the frozen food is regulated to be kept at −18 degrees C. or lower to suppress the influence of the deterioration of the frozen food due to the oxidation or the like, and the cell tissue destruction of the frozen food, which progress at a temperature of 0 degrees C. or lower.

In contrast, by making use of the technique of the present invention, the frozen food can be preserved hygienically in a temperature range of −18 degree C. to 0 degrees C. (−18 degree C. or higher and 0 degrees C. or lower), under which the frozen food could not be preserved hygienically in the conventional thawing method.

TABLE 3

| Application of voltage | Thawing/preservation at −3 degrees C. | Preservation at 30 degrees C. | Number of bacteria | Comparison of number of bacteria | Oxidation (color forming/change in color) state |
|---|---|---|---|---|---|
| Application | 24 h | 6 h | $3.3 \times 10^4$/g (33,000/g) | No foul odor of food is observed, number of bacteria is such that bacteria can be killed by cooking | Change in color due to oxidation is suppressed by oxidation suppressing effect |
| Non-application | 24 h | 6 h | $1.2 \times 10^5$/g (120,000/g) | Change in color due to oxidation is observed and number of bacteria is greater than that in voltage application thawing | Progress of oxidation, progress of change in color due to deterioration and shrinkage of cut edge are observed |

TABLE 4

Number of general bacteria [target: general food]
For food with standard and criterion, the number of bacteria
is required to comply with the reference within a time limit.
For food with no standard and criterion, a rough standard of
the number of bacteria is shown in the following table.
The numeric values indicate the "number" of bacteria
(mesophilic aerobacter) present in food, and the general bacteria
is typical hygiene indicator bacteria (contamination indicator
bacteria), the number of which is used to judge the microbial
contamination state (hygiene state) of the food.

| Number of general bacteria (number of living bacteria) | Applied | |
| --- | --- | --- |
| $1 \times 10^5$/g or less | Processed food (cooked food) | |
| $1 \times 10^6$/g or less | Unprocessed food (uncooked food) | |
| $1 \times 10^7$/g or more | Foul state in initial level | Sensual abnormality* has occurred |
| $1 \times 10^8$/g or more | Foul state | |

*Expanded, change in color, abnormal odor, turbid, softened, stretching out like a string, abnormal smell, abnormal taste, etc.

INDUSTRIAL APPLICABILITY

In accordance with the present invention, it becomes possible to obtain a novel thawing method of a frozen object, which can effectively perform the function of voltage application thawing, while properly controlling the thawing temperature of the frozen object, compared to a conventional thawing method. Therefore, the present invention can be utilized in, for example, a thawing machine which thaws the frozen food.

REFERENCE SIGNS LIST 10 container
11 AC power generating device
14 metal plate
17 elastic member (plate spring)
18 hook
21 frozen food
22, 23 door
100 thawing machine
101 table unit

The invention claimed is:

1. A method of thawing an object comprising cellular tissue in a frozen state placed in an interior of a container, in which an AC voltage between 10V and 5 kV is applied to the object in the frozen state to flow a current between 1 μA and 1000 mA through the object in the frozen state, the method comprising the steps of:
   partially thawing the object in the frozen state in such a manner that a temperature in the interior of the container is controlled to cause the object in the frozen state to be partially thawed, with the partial thawing occurring at a temperature below 0° C., while applying the AC voltage to the object in the frozen state; and
   stopping application of the AC voltage to the object and maintaining a state in which the object is partially thawed in the interior of the container without refreezing the object.

2. The method of thawing the object in the frozen state according to claim 1, further comprising the step of:
   thawing the object outside the container at a room temperature, with the container being used to provide the AC voltage, after stopping application of the AC voltage to the object.

3. A method of thawing an object comprising cellular tissue in a frozen state placed in an interior of a container, in which an AC voltage between 10V and 5 kV is applied to the object in the frozen state to flow a current between 1 μA and 1000 mA through the object in the frozen state, the method comprising the steps of:
   partially thawing the object in the frozen state in such a manner that a temperature in the interior of the container is controlled to cause the object in the frozen state to be partially thawed, with the partial thawing occurring at a temperature below 0° C., while applying the AC voltage to the object in the frozen state; and
   maintaining the a state in which the object is partially thawed without stopping application of the AC voltage to the object, at a first time point after the step of partially thawing the object in the frozen state;
   stopping application of the AC voltage to the object and maintaining a state in which the object is partially thawed in the interior of the container without refreezing the object at a second time point; and
   thawing the object outside the container at a room temperature, with the container being used to provide the AC voltage at a third time point.

* * * * *